(12) United States Patent
Strasser

(10) Patent No.: US 10,854,397 B2
(45) Date of Patent: Dec. 1, 2020

(54) ELECTRIC MACHINE, MOTOR VEHICLE WITH ELECTRIC MACHINE, AND METHOD FOR OPERATING AN ELECTRIC MACHINE

(71) Applicant: AUDI AG, Ingolstadt (DE)

(72) Inventor: Roman Strasser, Gaimersheim (DE)

(73) Assignee: AUDI AG, Ingolstadt (DE)

(\*) Notice: Subject to any disclaimer, the term of this patent is extended or adjusted under 35 U.S.C. 154(b) by 0 days.

(21) Appl. No.: 16/456,583

(22) Filed: Jun. 28, 2019

(65) Prior Publication Data
US 2020/0035423 A1 Jan. 30, 2020

(30) Foreign Application Priority Data
Jul. 27, 2018 (DE) .................. 10 2018 212 553

(51) Int. Cl.
| | |
|---|---|
| *H02P 6/16* | (2016.01) |
| *H01H 1/60* | (2006.01) |
| *H01H 1/36* | (2006.01) |
| *H02P 23/14* | (2006.01) |

(52) U.S. Cl.
CPC .............. *H01H 1/60* (2013.01); *H01H 1/36* (2013.01); *H02P 23/14* (2013.01); *H01H 2231/026* (2013.01)

(58) Field of Classification Search
CPC ......... H02P 2101/45; H02P 9/08; H02P 23/14
See application file for complete search history.

(56) References Cited

U.S. PATENT DOCUMENTS

2012/0274168 A1\* 11/2012 Holzner ................. H02K 1/246
310/156.53

FOREIGN PATENT DOCUMENTS

| DE | 3943651 C2 | 1/1993 |
|---|---|---|
| DE | 102004037918 A1 | 3/2006 |
| EP | 1115915 B1 | 7/2005 |
| GB | 832690 A | 4/1960 |
| JP | H04-4790 A | 1/1992 |

OTHER PUBLICATIONS

German Search Report dated Jan. 18, 2019 in corresponding German Application No. 10 2018 212 553.8; 27 pages.

\* cited by examiner

*Primary Examiner* — Karen Masih
(74) *Attorney, Agent, or Firm* — Maier & Maier, PLLC

(57) ABSTRACT

An electric machine, to a motor vehicle with such an electric machine, and to a method for operating such an electric machine. The electric machine includes at least one sliding contact which is formed by a slip ring connected to a rotor and by at least one brush and via which an operating current flows during an operation of the electric machine. A control unit is configured to control the operation of the electric machine. The control unit is configured to verify a predetermined operating criterion of the electric machine and, if said operating criterion is met, to inject a cleaning current according to a predetermined scheme, which then flows independently of the operating current via the sliding contact and cleans said sliding contact in order to maintain or improve a current transfer capability of the sliding contact.

19 Claims, 1 Drawing Sheet

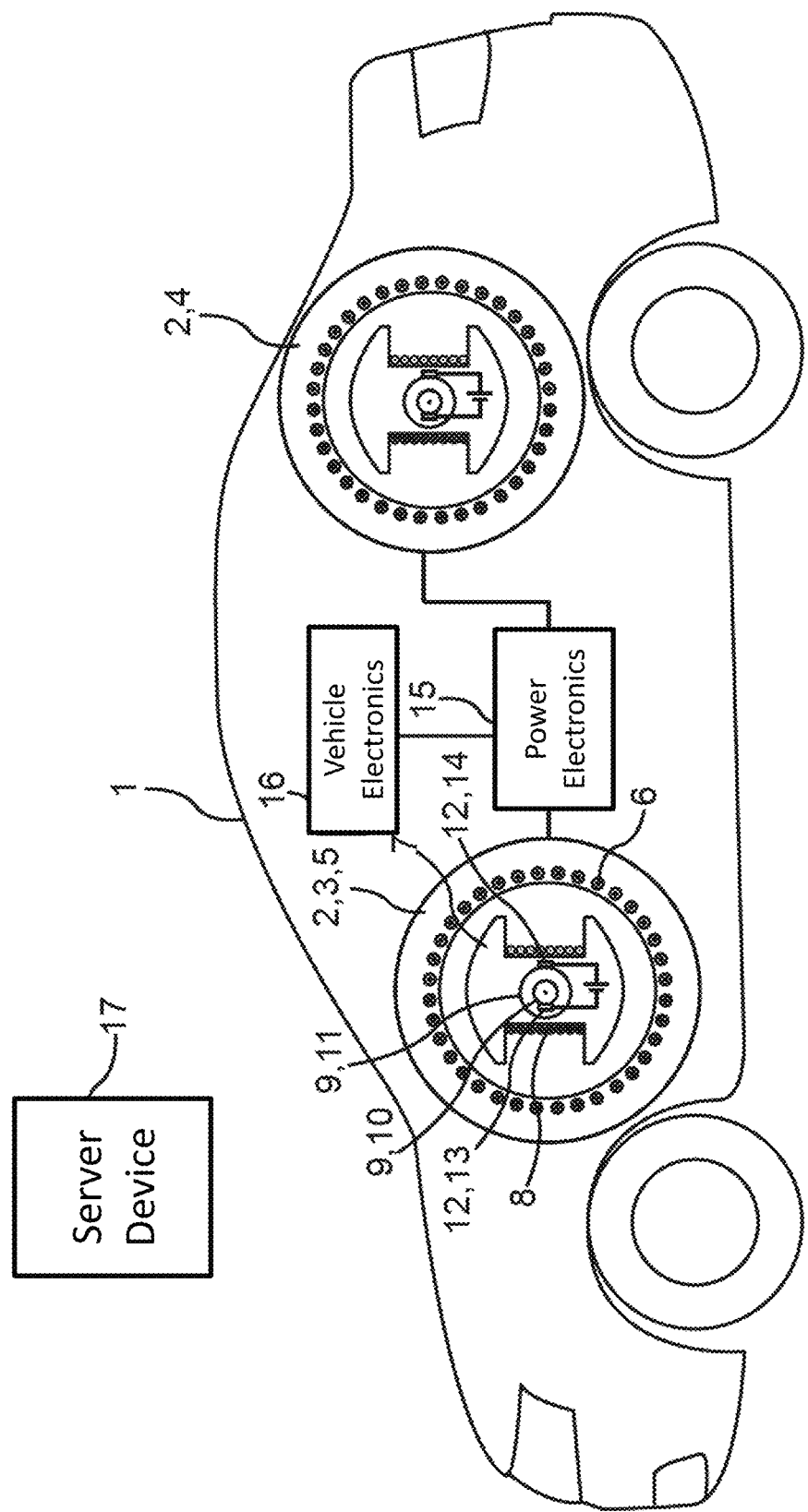

ELECTRIC MACHINE, MOTOR VEHICLE WITH ELECTRIC MACHINE, AND METHOD FOR OPERATING AN ELECTRIC MACHINE

FIELD

The disclosure relates to an electric machine, to a motor vehicle with an electric machine, and to a method for operating an electric machine.

BACKGROUND

In electric machines, sliding contacts are often used in order to transmit current between two components which move relatively to one another. At such sliding contacts, in particular due to a mechanical load and temperature effects, wear occurs, which can over the course of time worsen a current transfer capability of the respective sliding contact. This can result in the need for expensive repair or replacement of the corresponding sliding contact.

DE 39 43 651 C2 relates to an electric universal motor. Herein, a broad-surface axial contacting between a contact surface and a carbon brush sliding under pressure on said contact surface is described. As a result of the pressure, a constant mechanical cleaning action on the contact surfaces is achieved.

GB 832,690 A relates to a relay with two contact surfaces, of which one is mobile relative to the other one. There, it is described that the two contact surfaces are pushed together by a spring. In the process, the contact surfaces can move transversely and longitudinally relative to one another. In this manner, foreign matter such as, for example, lubricants, dust and oxides, are to be removed from the contact surfaces.

SUMMARY

The object of the present invention is to enable a particularly low-maintenance operation of an electric machine with a sliding contact. This object is achieved according to the invention by the subject matters of the independent claims.

An electric machine according to the invention has at least one sliding contact which is formed by a slip ring connected to a rotor of the electric machine and by at least one brush. Via this at least one sliding contact an operating current flows during an operation of the electric machine. Moreover, the electric machine has a control unit which is configured to control the operation of the electric machine. According to the invention, it is provided that the control unit is configured to verify a predetermined operating criterion of the electric machine and, if the predetermined operating criterion is met, to inject a cleaning current according to a predetermined scheme, which then flows independently of the operating current or in combination with said operating current via the sliding contact and cleans said sliding contact in order to maintain or improve a current transfer capability of the sliding contact. The cleaning current here is injected, that is to say fed, into the rotor, a rotor winding or rotor contacting or into an overall system of the electric machine. The electric machine can be provided in particular for a motor vehicle, for example, as drive motor. However, the invention is not limited to this application case but instead can be used in principle in almost any desired application fields.

The brush provided as part of the sliding contact can—without being limited thereto—be a carbon brush made of graphite. However, in the same way, as brush in this sense, an electrical contact of different design can be used, which is subject to wear due to a mechanical contact with the sliding ring. Two sliding rings each having at least one brush can be provided, wherein one of the sliding rings can then be used as positive contact or positive electrode, and the other of the sliding rings can be used as negative contact or negative electrode for the operating current flowing via said rings.

In the sense of the present invention, the operation of the electric machine, in which the operating current flows, is to be understood to be an application or use of the electric machine as motor or as generator. Depending on the type of operation, the rotor thus rotates relative to a stator of the electric machine in order to generate a drive torque or a drive power or a current, for example, a charging current for a battery. In particular, the operating current can thus be, for example, an excitation current which is used for generating a rotor field. The operating current is thus functionally linked to an operation of the electric machine as motor or generator. The rotor field and a stator field can here be synchronous with respect to one another in a permanently excited synchronous machine (PSM) or a separately excited synchronous machine (SSM), while they can be asynchronous with respect to one another in an asynchronous machine (ASM). On the other hand, the cleaning current is used for cleaning the sliding contact, that is to say it is not linked to the operation of the electric machine as a motor or a generator. Thus, the cleaning current does not flow permanently, in particular also not permanently during the operation of the electric machine or while the operating current is flowing.

Instead, the cleaning current flows only when the predetermined operating criterion is met, in particular for a time span defined by the predetermined scheme. If the corresponding verification indicates that the operating criterion is met, then the cleaning current is switched on and then switched off again according to the predetermined scheme, that is to say, for example, for a predetermined time duration or according to a predetermined pattern. The operating current in the meantime can flow as well before and/or after. However, since the operating current and the cleaning current flow at least temporarily simultaneously via the sliding contact, they can be considered to be portions of a total current flowing overall via the sliding contact. The injection or switching on of the cleaning current during the operation of the electric machine, that is to say while the operating current is flowing, can thus effectively be equivalent to an increase of the operating current.

Likewise, however, the cleaning current can be injected or switched on independently of the operation, for example, even when the electric machine is not being operated as a motor or a generator.

In a simple case, the operating criterion can relate, for example, to a certain operating time of the electric machine, so that the cleaning current can then thus be injected or fed in regularly. In the same way, the criterion can relate, for example, to a manual triggering of a corresponding cleaning function or of a service operation of the electric machine. Other possible variants or conditions of the operating criterion or for the operating criterion are explained in greater detail further below.

The control unit can be or comprise a control device or a control electronics, in particular a power electronics or a pulse inverter. The control unit can thus be designed and configured for actuating the electric machine. Here, depending on the application case, the control unit can be coupled to other not explicitly mentioned devices. In a motor vehicle, the control unit can be electrically connected, for example, to an on-board grid of the motor vehicle and/or to a traction battery of the motor vehicle, which can provide electrical energy for the operation of the electric machine.

During the operation of the electric machine, multiple wear effects can occur, which affect the current transfer capability of the sliding contact, that is to say which can worsen it over the course of time. Thus, the at least one brush can, for example, vitrify, wherein a surface of the brush hardens and/or becomes brittle, whereby a contact resistance of the sliding contact can be increased in an undesired manner. Here, for example, a contact surface, where in fact a physical, mechanical contact between the brush and the sliding ring exists, can become smaller, since the brush is then possibly not worn uniformly and is no longer uniformly and completely in contact with the sliding ring. Here, a surface roughness of the brush can also be increased, and electric flashovers between the brush and the sliding ring can occur, which can lead to damage to the sliding contact and to a further worsening of the current transfer capability.

An additional effect is referred to as smearing. Here, a material of the brush can be deposited on the sliding ring. This too can lead to an increased transition resistance of the sliding contact and to increased wear, since a surface or contact surface of the sliding ring is then no longer clean. These effects can limit the current transfer capability of the sliding contact to the extent that the electric machine can no longer generate sufficient power for the respective application case or fails completely. By means of the cleaning current, these undesired effects can be counteracted, in that the sliding contact, and thus the surfaces of the brush and of the sliding ring facing one another, expressed colorfully, are burned free, that is to say, for example, freed of undesired deposits or undesired abraded material. Here, both thermal and electrical effects can be active.

The predetermined operating criterion can be verified automatically. In the same way, the cleaning current can be switched on and off automatically by the control unit. The present invention thus makes it possible to increase a life span or useful life of the electric machine, in particular of the sliding contact, without automatically increasing active maintenance measures of an operator. Thereby, a savings of maintenance, material and costs can be achieved, and the electric machine can be operated over a longer time period efficiently and with rated power, that is to say the power provided in accordance with a design or specification.

In an advantageous design of the present invention, the electric machine is a separately excited synchronous machine (SSM). The operating current, in this case, is an excitation current for generating a magnetic field rotating with the rotor, that is to say the rotor field. It has been shown that in this application case the present invention can be used particularly effectively and usefully and with particularly low additional technical expenditure in order to increase a maintenance interval of the SSM.

In an additional advantageous design of the present invention, a current strength of the cleaning current or at least a peak value of the cleaning current, that is to its current strength, is a multiple of the operating current flowing via the sliding contact during normal or nominal operation of the electric machine without the cleaning current switched on. The normal operation of the electric machine is thus an operation of the electric machine in accordance with the intended use or specification as a motor or as a generator, wherein only the operating current, that is to say, for example, the excitation current for generating the rotor field, in this case, flows via the sliding contact. Without being limited thereto, the operating current or its current intensity can be, for example, 10 A, and the cleaning current or its peak value can be, in this case, for example, 50 A or 100 A. This is only intended to illustrate a possible ratio of the current strengths of the operating current and of the cleaning current and can vary by several orders of magnitude, for example, depending on the design of the electric machine.

Because the cleaning current or at least its peak value is thus many times greater than the operating current, that is to say an average or peak value of the operating current, it is possible to counteract particularly effectively and actively wear phenomena occurring during the operation and to remove or at least decrease particularly efficiently and effectively corresponding symptoms such as, for example, the mentioned deposits.

In a given case, an exact magnitude or strength of the cleaning current can depend on a design of the electric machine or of the sliding contact. Here, in a given case, it should be ensured that neither the electric machine nor the sliding contact is damaged by the cleaning current which is elevated in comparison to the operating current. In spite of a higher manufacturing cost possibly associated therewith, it can be overall advantageous over an operating time or lifetime of the electric machine to design the electric machine, in particular the sliding contact and corresponding feed lines, for the cleaning current which is higher compared to the operating current.

An additional aspect of the present invention is a method for operating an electric machine, in particular—without being limited thereto—for a motor vehicle. In the method according to the invention, by means of a control unit of the electric machine, at least one predetermined operating criterion of the electric machine is verified. If the predetermined operating criterion is met, a cleaning current is then injected or switched on by the control unit in accordance with a predetermined scheme, which cleaning current subsequently flows independently of the operating current via a sliding contact of the electrical machine and cleans said sliding contact in order to maintain or improve a current transfer capability of the sliding contact. The method according to the invention can thus be used in particular for operating at least one embodiment of the electric machine according to the invention. Accordingly, the electric machine mentioned in connection with the method according to the invention can in particular be the machine according to the invention. This also applies correspondingly to the components and devices mentioned in connection with the method according to the invention, for example, to the control unit, the sliding contact and the motor vehicle.

In an additional advantageous design of the present invention, a course of a load during the operation of the electric machine is monitored. As the predetermined operating criterion or as part of the predetermined operating criterion, it is verified whether, over a predetermined time span, the monitored load of the electric machine is below a predetermined load threshold value in at least a predetermined minimum proportion. In other words, it is determined whether the electric machine was operated continuously or at least substantially or based on a temporal average with a low load, that is to say in a low-load operation in which the current or average load is less than the load threshold value. Conversely, this means that, over this time span, the electric machine is or was then not operated with sufficiently high load or not long enough with sufficiently high load and accordingly sufficiently high operating current to maintain the current transfer capability of the sliding contact even without additional injection or switching on of the cleaning current, that is to say to counteract the described wear phenomena or prevent their occurrence. Thus, an operating status of the electric machine is monitored, and the cleaning current is injected or switched on only when needed. For this purpose, a special operating state or operating mode, for example, a cleaning operation or cleaning mode can be provided, for example, can be stored as operating profile in the control unit. By monitoring the load as operating criterion, it is possible to advantageously avoid switching on the cleaning current unnecessarily or unnecessarily often. Thereby, energy can advantageously be saved and an overall load of the electric machine can be minimized.

In an additional advantageous design of the present invention, as the predetermined operating criterion or as part of the predetermined operating criterion, it is verified whether a value of at least one predetermined operating parameter determined or measured automatically during the operation of the electric machine deviates from a predetermined target value for this operating parameter. The operating parameter can be an operating parameter of the electric machine or of a device in which or on which the electric machine is operated, that is to say, for example, of the motor vehicle. The operating parameter can in particular be the operating current, a torque, a rotation speed, a speed or a power output. In this manner, it is thus possible to determine or at least indirectly measure whether or how much the current transfer capability of the sliding contact has worsened in comparison to a corresponding rated value or status, that is to say a value or status which represents mint condition or is in compliance with specifications.

For this purpose, for example, the operating current flowing via the sliding contact can be measured directly. In the same way, for example, the torque, the rotation speed, the speed or the power output, which results on the output side of the electric machine in the case of a certain actuation of the electric machine or a certain control signal of the control unit, can be determined or measured. For example, the target value can be measured directly when in mint condition or after a verified maintenance or cleaning of the sliding contact. Here, multiple parameters can be taken into consideration such as, for example, an excitation current, an excitation voltage, a temperature of the electric machine, in particular of windings of the rotor and/or stator, a current and/or a voltage in the stator, a corresponding signal form and/or a corresponding modulation degree and/or the like. For example, a torque resulting under the respective measured or predetermined conditions or a corresponding power of the electric machine can then be measured and stored as the target value in a data memory of the electric machine or of the control unit. Corresponding target values can be determined, for example, in the context of manufacturing or production of the electric machine depending on a respective production specification.

For each electric machine, the target value can be measured individually particularly advantageously, for example, as part of a final testing or acceptance or dimensioning of the respective electric machine immediately after or at the end of the respective production. In this manner, the respective individual target value can be determined accurately and reliably, since electric machines manufactured in the same manner according to the same specification can be subject to individual fluctuations or variations. In the same way, the target value can be determined and/or updated, once again, in each case in the context of a regular maintenance or service examination of the motor vehicle or of the electric machine. Thereby, aging phenomena of the electric machine and/or of surrounding components or devices can advantageously be taken into consideration independently of the sliding contact, so that thereafter the cleaning current is in fact injected only when needed.

If the electric machine is used in the motor vehicle, the current value, that is to say an actual value, of the at least one predetermined operating parameter can be determined or calculated, for example, via stored coasting curves or resistance values of the motor vehicle during an operation of the motor vehicle. When, between the predetermined target value and the determined value, that is to say the actual value, of the predetermined operating parameter, for example, over a predetermined time period and/or in the case of certain driving maneuvers, a deviation results, this can be considered to be an indication that the current transfer capability of the sliding contact has been affected. By determining the respective current value of the at least one operating parameter and a comparison with the corresponding predetermined target value in the operation of the electric machine, a demand for the injection of the cleaning current can advantageously be determined particularly accurately and reliably.

Particularly advantageously, by means of a new determination of the current value of the at least one predetermined operating parameter after the injection, that is to say after an application or switching on and switching off of the cleaning current, its action can be objectively verified by comparison with the previously determined actual value. Thereby, for example, by multiple injections of the cleaning current and/or by automatically varying the cleaning current with regard to its duration and/or intensity, that is to say by automatically varying the predetermined scheme, an optimal current transfer capability of the sliding contact can be achieved or reestablished. In the same way, by means of such a procedure, a feedback loop can be implemented, in order to optimize the injection of the cleaning current, wherein in particular a neuronal network or another method of machine learning can be used for further optimization.

In an additional advantageous design of the present invention, the operation of the electric machine is monitored automatically, and the cleaning current is injected or switched on automatically when the electric machine is not being operated and has not been operated for at least a predetermined standstill duration. In other words, the cleaning current is thus applied while the electric machine is not being operated or used. Here, for example, a time of day can be taken into consideration in order to carry out the cleaning, for example, overnight. In the same way, for example, a place, that is to say a geographic position of the electric machine or of the motor vehicle or of the device on or in which the electric machine is arranged and/or an operating mode of the motor vehicle or of the device, can be taken into consideration. Here, advantageously, for example, by means of a neuronal network or another method of machine learning, an operating pattern or usage pattern of the electric machine can also be learned, and the cleaning current can then be injected in usage pauses and non-usage times—in particular those that are long enough in accordance with a corresponding automatic prediction based on the learned pattern.

When the electric machine is used in a motor vehicle, it is possible, for example, to verify whether the motor vehicle is located in a parking lot or parking site or in a garage and/or is connected, for example, to a charging station. From this, it can then be derived that the motor vehicle at that time is not being used by a respective operator, and accordingly the cleaning current can then be switched on when needed, that is to say the cleaning can be carried out. In this manner, it can be advantageously avoided that the injection of the cleaning current interacts or conflicts in an undesired manner with the operation of the electric machine, for example, in the form of an undesired additional torque, overheating and/or the like.

In an additional advantageous design of the present invention, as the predetermined operating criterion or as part of the predetermined operating criterion, a temperature of the electric machine, in particular a temperature of the rotor or of a rotor winding, is automatically monitored, that is to say measured. The cleaning current, in this case, is only injected or switched on when or if the monitored temperature is lower than a predetermined limit temperature. In other words, the cleaning of the sliding contact is thus carried out by means of the cleaning current only in a cold or colder status of the electric machine or of the motor vehicle—with respect to the predetermined limit temperature. This is particularly advantageous, since at lower temperatures the corresponding electrical conductors—for example a rotor winding—provided for conducting the cleaning current have a lower electric resistance, and thus a higher or greater cleaning current can be injected or fed in than would be the case under otherwise identical conditions. Thereby, the cleaning can be carried out particularly efficiently and effectively.

In an additional advantageous design of the present invention, as part of the predetermined scheme for a course of the cleaning current, a sequence of multiple current peaks and flanks lying in between with at least a predetermined minimum slope is predetermined. In other words, a certain pattern or certain signal form of the cleaning current is thus predetermined as the predetermined scheme. Thereby, a cleaning action of the cleaning current can be improved, for example, in comparison to a sinusoidal shape or a substantially constant current course with, in each case, only a relatively flat ascending and descending flank. A precise form of the course of the cleaning current, that is to say of the predetermined scheme, can depend, in a given case, on a design or a form of the sliding contact and/or on a power capability of an electrical supply of the electric machine.

In an additional advantageous design of the present invention, when cleaning current is injected, the electric machine can be operated automatically with a weakened stator field in comparison to a normal operation without cleaning current in order to compensate for a torque produced by the cleaning current. This can be implemented, for example, by a corresponding actuation of the stator or of an electrical supply of the stator by the control unit. By means of the weakened stator field, it can thus be achieved that, on the output side, no additional torque is applied or generated on the electric machine in spite of the cleaning current flowing in addition to the operating current via the sliding contact. Thereby, the cleaning can advantageously be carried out transparently for a respective user or operator during the operation of the electric machine, that is to say without influencing the operation.

In an additional advantageous design of the present invention, the electric machine has multiple sliding contacts for the electrical contacting, that is to say for the electrical supply, of the rotor. The cleaning current is not led or injected simultaneously via all of the multiple sliding contacts in each case, that is to say, for example, it is led or injected only via one or some but not all of the multiple sliding contacts. A torque produced by the cleaning current is compensated at least partially by weakening the operating current which in the process flows via at least one other of the multiple sliding contacts via which the cleaning current in each case is not led or injected. In other words, the cleaning current therefore is used both for cleaning at least one of the multiple sliding contacts and also for generating at least part of the rotor field for the operation of the electric machine. This part or portion of the rotor field would be generated by the operating current without injected cleaning current. Thus, for example, each of the multiple sliding contacts can be cleaned individually by exposure to the cleaning current, while at the same time in the process the rest of the multiple sliding contacts are supplied with weakened operating current, only, or no current at all. This enables a particularly efficient and effective cleaning of the sliding contacts. In addition, additional effort for compensating for the torque possibly produced by the cleaning current can be avoided or reduced and/or overloading electrical conductors can be avoided.

In an additional advantageous design of the present invention, respective operating and status data is transmitted to a central server device by a plurality of additional electric machines. The operating data indicates an operating history of the respective electric machine, while the status data indicates a corresponding operating behavior of the respective electric machine. The central server device can in particular be a vehicle-external backend or cloud server. By means of the central server device, a cleaning strategy is automatically determined by evaluating the transmitted operating and status data. The control unit of the electric machine then injects the cleaning current according to the determined cleaning strategy for cleaning the electric machine.

In particular, herein, the control unit can take into consideration respective current operating and status data of the electric machine to be cleaned, that is to say, for example, compare it with the determined cleaning strategy. In other words, the operating and status data of the plurality of additional electric machines, that is to say, for example, of a vehicle fleet, is then acquired and evaluated as swarm data. Compared to the operating and status data of an individual electric machine, this swarm data forms a larger data base, based on which a particularly effective and efficient cleaning strategy can automatically be learned or determined. Thus, the particular operating statuses, operating types or operating history, that is to say operating courses, influencing the operating behavior of the electric machine and/or of the motor vehicle and possibly making it necessary to clean the respective sliding contact, and the time at which or after which and how said behavior is influenced, can be derived automatically from the operating and status data.

Likewise, based on the master data, it is possible to determine, for example, a target value for the operating behavior, that is to say, for example, for the mentioned at least one predetermined operating parameter, which can expectedly be achieved by the cleaning and/or after the cleaning. Particularly advantageously it is possible that, as part of the operating and status data, times, time periods and intensities and/or courses of respective applied or injected cleaning currents are transmitted and evaluated by the central server device. Then, it is possible to provide that the central server device determines the cleaning strategy for a certain electric machine, respectively, based on individual operating and status data of this electric machine and transmits it to the control unit of this electric machine. In the same way, it is possible to provide that the central server device determines the cleaning strategy for a plurality of different operating histories and operating behaviors, that is to say operating and status data, for example, in the form of or using a characteristic diagram, a function set or the like. Based on this cleaning strategy and the individual operating and status data determined for the respective electric machine, the control unit of the individual electric machine can subsequently determine when and in accordance with which scheme the cleaning current should be injected, for example, in order to achieve a particularly effective and/or efficient cleaning of the respective sliding contact.

An additional aspect of the present invention is a motor vehicle with at least one embodiment of the electric machine according to the invention and/or an electric machine which is configured to carry out at least one embodiment of the method according to the invention. The motor vehicle according to the invention can thus, in particular, be the motor vehicle mentioned in connection with the electric machine according to the invention and/or mentioned in connection with the method according to the invention. Accordingly, the motor vehicle according to the invention can thus have some or all of the properties and/or devices or components mentioned in connection with the electric machine according to the invention and/or in connection with the method according to the invention. In the same way, the measures or processes mentioned in connection with the electric machine according to the invention and/or in connection with the motor vehicle according to the invention can be part of the method according to the invention, accordingly.

In an additional advantageous design of the present invention, the motor vehicle has a second electric machine and is configured to automatically compensate for a torque generated by the cleaning current by a counter torque generated by the second electric machine. In other words, the electric machine can thus be operated or actuated in a coordinated manner with the second electric machine, for example in order to avoid a change in the speed of the motor vehicle due to the cleaning current. Here, for example, one of the electric machines can be operated in motor mode and the other of the two electric machines can be operated in a generator mode or recovery mode. Thereby, it can thus become possible to recover at least a portion of the energy used for the cleaning, that is to say for the generation and injection of the cleaning current, via the second electric machine, whereby an overall efficiency of the motor vehicle can be improved.

The invention also includes the combinations of the features of the described aspects and embodiments of the invention.

The invention also includes further developments of the electric machine according to the invention, of the motor vehicle according to the invention and of the method according to the invention, which have features as described in connection with the developments of each one of others of these aspects of the invention. In order to avoid redundancy, the corresponding further developments are not described here again separately for each of the aspects of the invention.

Below, embodiment examples of the invention are described. For this purpose, the single FIGURE shows a diagrammatic side view of a motor vehicle with two electric machines.

The embodiment examples explained below are preferred embodiments of the invention. In the embodiment examples, the described components of the embodiments in each case represent individual features of the invention to be considered independently of one another, which also each develop the invention independently of one another. Therefore, the disclosure is intended to also cover combinations of the features of the embodiments other than those represented. Moreover, features other than the already described features can also be added to the described embodiments.

BRIEF DESCRIPTION OF THE DRAWINGS

The single FIGURE shows a diagrammatic side view of a motor vehicle 1 with two electric machines 2, not represented true to scale here, namely a first electric machine 3 and a second electric machine 4. The first electric machine 3, here, can be provided for driving a front axle of the motor vehicle 1 and the second electric machine 4 can be provided for driving a rear axle of the motor vehicle 1.

DETAILED DESCRIPTION

The electric machines 2 in the present case are separately excited synchronous machines. Thus, the electric machines 2 are of identical design, herein, and therefore have the same components, wherein for the sake of clarity, said components are marked individually only for the first electric machine 3.

The first electric machine 3 comprises a stator 5 with a stator winding 6 and a rotor 7 with a rotor winding 8, which is arranged rotatably mounted in the stator 5. In the present case, two slip rings 9, namely a first slip ring 10 and a second slip ring 11, are arranged on the rotor 7. The slip rings 9 are electrically contacted by carbon brushes 12, wherein a first carbon brush 13 forms a first sliding contact with the first slip ring 10, and a second carbon brush 14 forms a second sliding contact with the second slip ring 11. The rotor 7 can be supplied with an excitation current via the sliding contacts in order to generate a rotor field of the respective electric machine 2.

Also diagrammatically represented is a power electronics 15 which is connected to the electric machine 2. The power electronics 15 is used for controlling or actuating the electric machine 2. Although the power electronics 15 is represented diagrammatically as a component, herein, a separate corresponding power electronics 15 can also be provided for each of the two electric machines 2, which can then be coupled to one another by a corresponding data connection.

Moreover, diagrammatically represented is a vehicle electronics 16 of the motor vehicle 1, which is connected to the power electronics 15 by a data connection, for example, an on-board grid of the motor vehicle 1. The vehicle electronics 16 can acquire, for example, driving operation, status and/or power data of the motor vehicle and transmit the data to the power electronics 15. The power electronics 15 in the present case comprises a data processing device for processing said data and additional data. This data processing device itself comprises a data memory and a processor device connected to said data memory. In the present case, a program code is stored in the data memory; it codes or represents method steps of a method for operating the electric machine 2 and is designed and configured for the execution of this method by means of the processor device and thus for the corresponding control or actuation of the electric machines 2.

In order to operate the electric machines 2 in a particularly low-maintenance manner, it is provided in the present case that, by means of the power electronics 15 and/or the vehicle electronics 16, at least one predetermined operating criterion of the electric machines 2 or of the motor vehicle 1 is verified or monitored, and, if this operating criterion is met, in accordance with a predetermined scheme, a cleaning current is injected via the sliding contacts, that is to say the carbon brushes 12 and the slip rings 9, into the rotor 7 or the rotor winding 8 or in general into the respective electric machine 2, here, for example, the first electric machine 3. This cleaning current then flows via the sliding contacts, independently of the excitation current which is also flowing via these sliding contacts during the operation of the first electric machine 3 and which is therefore being used as operating current. By means of the cleaning current, the sliding contacts are cleaned in order to maintain or improve their current transfer capability.

By means of the cleaning current, that is to say in practice or in fact, for example, the excitation current increased by the cleaning current, the sliding contacts are burned free, that is to say cleaned. This can occur prophylactically or only when needed. A prophylactic cleaning, that is to say switching on or injecting the cleaning current, can be carried out, for example, as a regular automatic cleaning or maintenance measure in order to avoid noticeable or significant worsening of the current transfer capability of the sliding contacts by vitrification or smearing. As needed, the cleaning current can be switched on or injected when an affected or reduced current transfer capability of the sliding contacts is or has been detected. If needed, this can occur automatically during an operation of the electric machine 2 or of the motor vehicle 1, for example, under certain operating conditions.

In the same way, the cleaning of the sliding contacts by means of the cleaning current can be triggered manually, for example, in the context of an inspection service, for example, via a call-up of a corresponding function of the power electronics 15, provided specifically for this purpose.

So that a driver of the motor vehicle 1 while driving does not obtain additional and undesired torque due to the cleaning current or due to the correspondingly increased excitation current, a stator field of the respective electric machine 2 can thus be correspondingly reduced and/or the rotor field can be actively weakened when cleaning current is injected, that is to say during a cleaning phase. In the same way, the cleaning can be carried out during a standstill of the motor vehicle 1. This can occur, for example, with the stator field switched off, so that no torque is generated for the motor vehicle 1. The cleaning, that is to say a corresponding cleaning process, can, for example, occur automatically or in a self-sufficient manner in the absence of the driver, for example, at night, while the motor vehicle 1 is parked, that is to say at standstill. This is also particularly advantageous since the cleaning current is then injected when the respective electric machine 2 is in a cold state, so that the corresponding conductors in the rotor 7 have a lower resistance and thus a higher cleaning current can be injected.

When and whether the cleaning is necessary can be determined based on data of the motor vehicle 1—determined, for example, by means of the power electronics 15 and/or the vehicle electronics 16—and/or taking into consideration corresponding operating and status data of additional vehicles with corresponding electric machines 2. From these additional vehicles, corresponding operating and status data, that is to say corresponding swarm data, can be transmitted to a vehicle-external server device 17 represented diagrammatically here. The server device 17 processes this data and establishes a cleaning strategy for the electric machines 2 of the motor vehicle 1 based on said data and based on corresponding operating and status data of the motor vehicle 1. Thus, data and experiences from a plurality of vehicles and electric machines 2 are evaluated, for example in order to determine an optimal time and/or an optimal scheme or profile, that is to say, for example, an optimal signal form, for the cleaning current. Corresponding results, that is to say, for example, the cleaning strategy and/or a corresponding control signal for triggering the cleaning, that is to say for the injection of the cleaning current, are then transmitted by the server device 17 to the motor vehicle 1, in particular to the power electronics 15.

For the automatic detection of whether and when the cleaning is necessary, it is possible, for example, to carry out at regular intervals a comparison between an actual value determined during the operation of the electric machines 2 or of the motor vehicle 1 and a corresponding stored target value of at least one operating parameter of the electric machines 2 or of the motor vehicle 1. For this purpose, for example, a certain torque or a certain power can be determined and thus the target value can be predetermined and thus stored, for example, in a memory of the power electronics 15, which torque or power the electric machines 2 or the motor vehicle 1 generate(s) when in mint condition or in a status classified as in order. This can occur as a function of the excitation current, a corresponding excitation voltage, a temperature of the rotor winding 8 and/or of the stator winding 6, a current and/or a voltage in the stator 5 and/or the like.

Corresponding target values can be measured preferably in an EOL test ("End Of Line") at the time of the inspection and approval of the electric machines 2 or of the motor vehicle 1 at the end of a respective production. In the same way, a test program predetermined for this purpose or a corresponding test mode of the motor vehicle 1 or of the electric machines 2 can be used, for example, in the context of a maintenance or service inspection of the motor vehicle 1. The actual value of the corresponding operating parameter of the electric machines 2, of the motor vehicle 1 or for example of a drive or drive train of the motor vehicle 1 can also be calculated online, that is to say during an operation of the motor vehicle 1, via coasting curves and resistance values of the motor vehicle 1 or the like, which are also stored in the memory of the power electronics 15. When, between the stored target value and the calculated actual value, for example, over a predetermined time period and/or during certain driving maneuvers of the motor vehicle 1, a deviation going beyond a predetermined threshold value results, this can be due to a limited power transmission capability for the transmission of the excitation current via the sliding contacts and thus lead to an automatic triggering of the cleaning.

Likewise, the actually flowing excitation current can be measured and compared with a corresponding target value in the case of clean sliding contacts. If, in the case of a certain control of the electric machines 2, that is to say, for example, in response to a certain control signal of the power electronics 15, a lower excitation current than expected according to intended use or specification flows, this can also be caused by wear, that is to say a correspondingly limited current transfer capability of the sliding contacts, and accordingly also lead to the automatic triggering of the cleaning.

If, in the present case, two electric machines 2 are present in the motor vehicle 1, an increased torque on the front axle of the motor vehicle 1 produced by the cleaning current can be compensated during the cleaning process of the first electric machine 3 by a corresponding counter torque generated by the second electric machine 4 on the rear axle of the motor vehicle 1.

If the motor vehicle 1 is moved relatively little and/or with relatively low load, this can be detected automatically, for example, by monitoring the load curve and comparison with a predetermined load threshold value. In such a case, the cleaning current can be injected, for example, over a longer time period, the electric machines 2 can thus be effectively operated with an elevated excitation current, so that in spite of a—for example elevated—transition resistance of the sliding contacts, a total current flowing during operation via these sliding contacts reaches at least a level or intensity of the nominal operating current nominally provided for the corresponding operation or, for example, reaches a predetermined minimum current intensity so that a manual cleaning of the sliding contacts is necessary less frequently.

Overall, the described examples show how a particularly low-maintenance operation of an electric machine 2 with a sliding contact can be enabled.

The invention claimed is:

1. An electric machine, in particular for a motor vehicle, comprising:
    at least one sliding contact which is formed by a slip ring connected to a rotor of the electric machine and by at least one brush, and via which an operating current flows during an operation of the electric machine, and with a control unit which is configured to control the operation of the electric machine,
    wherein the control unit is configured to verify a predetermined operating criterion of the electric machine and, if the predetermined operating criterion is met, to inject a cleaning current according to a predetermined scheme, which then flows independently of the operating current via the sliding contact and cleans said sliding contact in order to service a current transfer capability of the sliding contact,
    wherein, when the cleaning current is injected, the electric machine is operated automatically with a stator field which is weakened with respect to a normal operation without cleaning current in order to compensate for a torque produced by the cleaning current.

2. The electric machine according to claim 1, wherein the electric machine is a separately excited synchronous machine, and in that the operating current is an excitation current for generating a magnetic field rotating with the rotor.

3. The electric machine according to claim 1, wherein at least one peak value of the cleaning current is a multiple of the operating current flowing via the sliding contact during normal operation of the electric machine without the cleaning current switched on.

4. A method for operating an electric machine, in particular for a motor vehicle, comprising:
    verifying a control unit of the electric machine, at least one predetermined operating criterion of the electric machine is verified, wherein if the predetermined operating criterion is met, a cleaning current is injected by the control unit according to a predetermined scheme via a sliding contact which is formed by a slip ring connected to a rotor of the electric machine and by at least one brush, which cleaning current then flows independently of the operating current via the sliding contact and cleans said sliding contact in order to service a current transfer capability of the sliding contact,
    wherein, when the cleaning current is injected, the electric machine is operated automatically with a stator field which is weakened with respect to a normal operation without cleaning current in order to compensate for a torque produced by the cleaning current.

5. The method according to claim 4, wherein a course of a load during the operation of the electric machine is monitored, and as the predetermined operating criterion, it is verified whether the load is at least in a minimum predetermined proportion below a predetermined load threshold value over a predetermined time span.

6. The method according to claim 4, wherein as the predetermined operating criterion, it is verified whether a value, automatically determined during operation of the electric machine, of at least one predetermined operating parameter deviates from a predetermined target value for this operating parameter, wherein, as the operating parameter, in particular the operating current, a torque, a rotation speed, a speed or a power output is determined.

7. The method according to claim 4, wherein the operation of the electric machine is automatically monitored, and the cleaning current is automatically injected when the electric machine is not being operated and has not been operated for at least a predetermined standstill duration.

8. The method according to claim 4, wherein as the predetermined operating criterion, a temperature of the electric machine is automatically monitored, and the cleaning current is injected only when the monitored temperature is lower than a predetermined limit temperature.

9. The method according to claim 4, wherein as part of the predetermined scheme for a course of the cleaning current, a sequence of multiple current peaks and flanks lying in between with at least a predetermined minimum slope is predetermined.

10. The method according to claim 4, wherein the electric machine has multiple sliding contacts for the electric contacting of the rotor,
    the cleaning current, in each case, is injected only via one or via less than all of the multiple sliding contacts at a time, and
    a torque produced by the cleaning current is compensated at least partially by weakening the operating current which, in the process, flows via at least one of the multiple sliding contacts via which the cleaning current is not led, respectively.

11. The method according to claim 4, wherein by means of a plurality of additional electric machines, respective operating data which indicates an operating history of the respective electric machine and respective status data which indicate a corresponding operating behavior of the respective electric machine, are transmitted to a central server device,
    by means of the central server device, a cleaning strategy is automatically determined by evaluating the transmitted operating and status data, and
    the control unit of the electric machine injects the cleaning current according to the predetermined cleaning strategy, in particular as a function of respective current operating and status data of the electric machine.

12. The electric machine according to claim 2, wherein at least one peak value of the cleaning current is a multiple of the operating current flowing via the sliding contact during normal operation of the electric machine without the cleaning current switched on.

13. The method according to claim 5, wherein as the predetermined operating criterion, it is verified whether a value, automatically determined during operation of the electric machine, of at least one predetermined operating parameter deviates from a predetermined target value for this operating parameter, wherein, as the operating parameter, in particular the operating current, a torque, a rotation speed, a speed or a power output is determined.

14. The method according to claim 5, wherein the operation of the electric machine is automatically monitored, and the cleaning current is automatically injected when the electric machine is not being operated and has not been operated for at least a predetermined standstill duration.

15. The method according to claim 6, wherein the operation of the electric machine is automatically monitored, and the cleaning current is automatically injected when the electric machine is not being operated and has not been operated for at least a predetermined standstill duration.

16. The method according to claim 5, wherein as the predetermined operating criterion, a temperature of the electric machine is automatically monitored, and the cleaning current is injected only when the monitored temperature is lower than a predetermined limit temperature.

17. The method according to claim 6, wherein as the predetermined operating criterion, a temperature of the electric machine is automatically monitored, and the cleaning current is injected only when the monitored temperature is lower than a predetermined limit temperature.

18. The method according to claim 7, wherein as the predetermined operating criterion, a temperature of the electric machine is automatically monitored, and the cleaning current is injected only when the monitored temperature is lower than a predetermined limit temperature.

19. The method according to claim 5, wherein as part of the predetermined scheme for a course of the cleaning current, a sequence of multiple current peaks and flanks lying in between with at least a predetermined minimum slope is predetermined.

\* \* \* \* \*